United States Patent Office 3,346,592
Patented Oct. 10, 1967

3,346,592
OXACYCLOBUTANE BIS(THIOSULFONATES)
Joseph E. Dunbar, Midland, Mich., assignor to The Dow Chemical Company, Midland, Mich., a corporation of Delaware
No Drawing. Filed June 3, 1965, Ser. No. 461,152
6 Claims. (Cl. 260—333)

The present invention is directed to new and novel oxacyclobutane bis(thiosulfonates). The new compounds of the present invention correspond to the formula

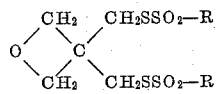

In this and succeeding formulae, R represents lower alkyl, phenyl, halophenyl, methylphenyl or methoxyphenyl. Lower alkyl as employed in the present specification and claims represents an alkyl group containing 1, to 2, to 3 to 4 carbon atoms. Representative alkyl groups include methyl, ethyl, propyl, isopropyl, butyl, sec.-butyl, and tert.-butyl. The compounds of the present invention are solids or oils which are of very low solubility in water and of moderate solubility in many organic solvents. They are useful as pesticides for the control of various insect, fungal, bacterial and helminth organisms such as apple scab, cockroaches, potato scab, nematodes, *Bacillus subtillus* and *Pullularia pullulans*.

The novel oxacyclobutane bis(thiosulfonates) of the present invention are prepared by contacting an alkali metal salt of a thiosulfonic acid corresponding to the formula alkali metal —SSO$_2$R with 3,3-bis(bromomethyl)oxacyclobutane.

The reaction conveniently is carried out in an organic liquid as reaction medium such as sulfolane, dimethylsulfone, dimethylformamide, acetone, ethanol, methanol, aqeuous methanol, aqueous acetone or aqueous ethanol. The amounts of the reagents to be employed and the reaction conditions are not critical, some of the desired product being obtained at once when employing any proportion of the reactants. However, the reaction consumes the reactants in molecular proportions of two moles of alkali metal salt of the thiosulfonic acid for every mole of the 3,3-bis(bromomethyl)oxacyclobutane. Representative thiosulfonic acid salts include sodium 2,5-dimethoxybenzenethiosulfonate,
potassium 4-fluorobenzenethiosulfonate,
sodium 2,5-dibromobenzenethiosulfonate,
sodium 3,4-dimethylbenzenethiosulfonate,
sodium 3,5-dimethylbenzenethiosulfonate,
potassium 3,4,5-tribromobenzenethiosulfonate,
potassium 3,5-dibromobenzenethiosulfonate,
potassium 3,4-dimethoxybenzenethiosulfonate,
sodium 3,4,5-trichlorobenzenethiosulfonate,
potassium 2,5-difluorobenzenethiosulfonate, and
sodium pentachlorobenzenethiosulfonate.

The reaction takes place smoothly at temperatures at which the alkali metal halide of reaction is formed and conveniently at temperatures between 25° and 150° C. In a preferred procedure, the reaction is carried out at temperatures between 60° and 120° C. In such a preferred method it is oftentimes convenient to operate at the boiling temperature of the reaction mixture and under reflux. Cessation in the formation of the halide of reaction is evident of completion of the reaction.

In carrying out the reaction, the reactants are mixed and contacted together in any convenient fashion and the temperature of the resulting mixture maintained for a period of time in the reaction temperature range to insure completion of the reaction. Following the reaction, the reaction mixture is processed by conventional procedures to obtain the desired product. In one such procedure, the reaction mixture is filtered while hot to remove the halide of reaction, and the filtrate is then cooled. During the cooling the desired product separates in the filtrate as a crystalline solid or an organic oil and is collected by decantation or filtration. This product can be employed in pesticidal compositions, or further purified in usual procedures such as washing and recrystallization from common organic solvents. In another convenient procedure, the organic reaction medium can be removed by evaporation under reduced pressure leaving the desired product as a residue. This residue can then be further purified as described above.

The following examples are merely illustrative and are not intended to be limiting.

EXAMPLE I 3,3-bis(ethylsulfonylthiomethyl)oxacyclobutane

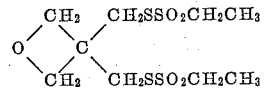

Potassium ethanethiosulfonate (27.9 grams; 0.170 mole) and 3,3-bis(bromomethyl)oxacyclobutane (20.0 grams; 0.082 mole) were contacted with stirring in 250 ml. of acetonitrile. The resulting mixture was heated at the boiling temperature, with stirring and under reflux, for 22 hours. During the reflux period, the potassium bromide by-product of reaction precipitated in the reaction mixture as a solid. Following the reflux period, this by-product of reaction was removed from the reaction mixture by filtration. The filtered reaction mixture was then subjected to evaporation under reduced pressure to remove the solvent, acetonitrile, and to obtain the product as a viscous oil which crystallizes upon standing. This crystalline material was recrystallized from ethanol to give 3,3-bis(ethylsulfonylthiomethyl)oxacyclobutane. The recrystallized product melted at 78–78.5° C. and had carbon, hydrogen and sulfur contents of 32.40 percent, 5.37 percent and 38.56 percent, respectively, as compared to the theoretical contents of 32.32 percent, 5.42 percent and 38.34 percent, respectively.

EXAMPLE II 3,3-bis(2,5-dimethylphenylsulfonylthiomethyl)oxacyclobutane

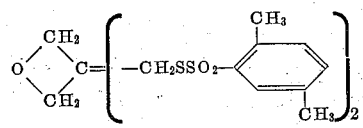

Potassium 2,5 - dimethylbenzenethiosulfonate (39.4 grams; 0.164 mole) and 3,3-bis(bromomethyl)oxacyclobutane (20.0 grams; 0.082 mole) were dispersed with stirring in 250 milliliters of acetonitrile. Thereafter the reaction mixture was processed under the same conditions as set forth in Example I. The crude product obtained from the evaporation of the solvent was recrystallized from methanol. The recrystallized 3,3-bis(2,5-dimethylphenylsulfonylthiomethyl)oxacyclobutane product melted at 108–109° C. and had carbon, hydrogen and sulfur contents of 51.60 percent, 5.20 percent and 26.62 percent, respectively, as compared to the theoretical contents of 51.83 percent, 5.38 percent and 26.35 percent, respectively.

The following compounds of the present invention were prepared in the same manner.

3,3 - bis (methylsulfonylthiomethyl) oxacyclobutane (melting at 139.5–140.5° C. and having carbon, hydrogen and sulfur contents of 27.47 percent, 4.56 percent and 42.03 percent, respectively, as compared to the theoretical contents of 27.44 percent, 4.60 percent and 41.85 percent, respectively) by reacting together potassium methanethiosulfonate and 3,3 - bis(bromomethyl)oxacyclobutane.

3,3 - bis(p - bromophenylsulfonylthiomethyl)oxacyclobutane (melting at 109–109.5° C. and having carbon, hydrogen and bromine contents of 34.93 percent, 2.83 percent and 27.03 percent, respectively, as compared with the theoretical contents of 34.70 percent, 2.74 percent, and 27.17 percent, respectively) by reacting together sodium p-bromobenzenethiosulfonate and 3,3-bis(bromomethyl)oxacyclobutane.

3,3 - bis(3,4 - dichlorophenylsulfonylthiomethyl)oxacyclobutane (melting at 138.5–139.5° C. and having carbon, hydrogen and chlorine contents of 36.14 percent, 2.29 percent, and 24.96 percent, respectively, as compared to the theoretical contents of 35.92 percent, 2.48 percent and 24.95 percent, respectively) by reacting together potassium 3,4-dichlorobenzenethiosulfonate and 3,3-bis(bromomethyl)oxacyclobutane.

3,3 - bis(4 - methoxyphenylsulfonylthiomethyl)oxacyclobutane (melting at 95–96.5° C. and having carbon, hydrogen and sulfur contents of 46.73 percent, 4.61 percent, and 26.12 percent, respectively, as compared to the theoretical contents of 46.51, 4.52 and 26.14 percent, respectively) by reacting together potassium 4-methoxybenzenethiosulfonate and 3,3-bis(bromomethyl)oxacyclobutane.

3,3 - bis(p - tolylsulfonylthiomethyl)oxacyclobutane (melting at 89.5–90.5° C. and having carbon, hydrogen and sulfur contents of 49.67 percent, 4.76 percent, and 28.44 percent, respectively, as compared to the theoretical contents of 49.76 percent, 4.84 percent and 27.96 percent, respectively) by reacting together potassium p-toluenethiosulfonate and 3,3-bis(bromomethyl)oxacyclobutane.

3,3 - bis(n - butylsulfonylthiomethyl)oxacyclobutane (melting at 56.5–58.5° C. and having carbon, hydrogen and sulfur contents of 40.27 percent, 6.54 percent and 33.23 percent, respectively, as compared to the theoretical contents of 39.97, 6.71 and 32.83 percent, respectively) by reacting together potassium n-butanethiosulfonate and 3,3-bis(bromomethyl)oxacyclobutane.

3,3 - bis(phenylsulfonylthiomethyl)oxacyclobutane (a light yellow oil, exhibiting characteristic strong thiosulfonate bands in the infrared spectrum at 1130 cm.$^{-1}$ and 1330 cm.$^{-1}$ and having carbon, hydrogen and sulfur contents of 47.62 percent, 4.08 percent and 29.50 percent, respectively, as compared to the theoretical contents of 47.42 percent, 4.21 percent and 29.79 percent, respectively) by reacting together potassium benzenethiosulfonate and 3,3-bis(bromomethyl)oxacyclobutane.

The compounds of the present invention or compositions or formulations containing the same can be applied to pests and their habitats and their food in parasiticidal amounts to obtain excellent controls and kills of many organisms. The compounds can be conveniently employed in liquid or dust formulations. In such uses, the compounds are modified with one or a plurality of adjuvants or helpers including water, organic solvents, petroleum oils, petroleum distillates, or other liquid carriers, surface active dispersing agents and finely divided solids such as chalk, talc or bentonite. In other embodiments, they can be employed as concentrates, and subsequently diluted with additional liquid or solid adjuvants to produce the ultimate treating composition.

In representative operations, liquid compositions containing 3,3-bis(ethylsulfonylthiomethyl)oxacyclobutane at concentrations of 500 parts per million by weight give complete kills of apple scab. In other operations, aqueous compositions containing 3,3-bis(p-bromophenylsulfonyl)oxacyclobutane at a concentration of 300 parts per million give 100 percent kills of root knot nematodes. In still other operations, compositions containing 3,3-bis(2,5-dimethylphenylsulfonylthiomethyl)oxacyclobutane at concentrations of 500 parts per million give complete kills of citrus green mold, fungus potato scab, bacterium fire blight, *Staphylococcus aureus, Pythium ultimum* and *Trichophyton mentagrophytes*.

The thiosulfonates emlpoyed as starting materials in accordance with the teachings of the present invention can be prepared in accordance with known methods. In one method, potassium hydrosulfide (KSH) is reacted with a suitable lower alkane, benzene, methoxybenzene, halobenzene or methylbenzene. Representative halides are 3,5-dimethylbenzenesulfonyl chloride, 2,4,5-trichlorobenzenesulfonyl bromide, propanesulfonyl chloride, pentanesulfonyl chloride and 2-propanesulfonyl chloride. In a convenient procedure, the reaction is carried out by adding the sulfonyl halide to an aqueous or alcoholic solution of potassium hydroxide saturated with H$_2$S. Upon completion of the reaction, the desired starting materials are separated by conventional procedures.

I claim:
1. The compound having the formula

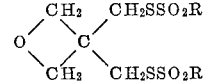

wherein R represents a member of the group consisting of lower alkyl, phenyl, halophenyl, methylphenyl and methoxyphenyl.

2. 3,3-bis(methylsulfonylthiomethyl)oxacyclobutane.
3. 3,3-bis(ethylsulfonylthiomethyl)oxacyclobutane.
4. 3,3 - bis(2,5 - dimethylphenylsulfonylthiomethyl)oxacyclobutane.
5. 3,3 - bis(p - bromophenylsulfonylthiomethyl)oxacyclobutane.
6. 3,3-bis(n-butylsulfonylthiomethyl)oxacyclobutane.

References Cited

UNITED STATES PATENTS 3,195,838    10/1963    Luskin _____ 260—333

WALTER A. MODANCE, *Primary Examiner.*

N. MILESTONE, *Assistant Examiner.*